July 7, 1931.  F. B. THOMPSON  1,813,000
PHOTOGRAPHIC FILM PRINTER
Filed April 28, 1926   3 Sheets-Sheet 1

Inventor
Fredrick B. Thompson
By Lyon & Lyon
Attorneys

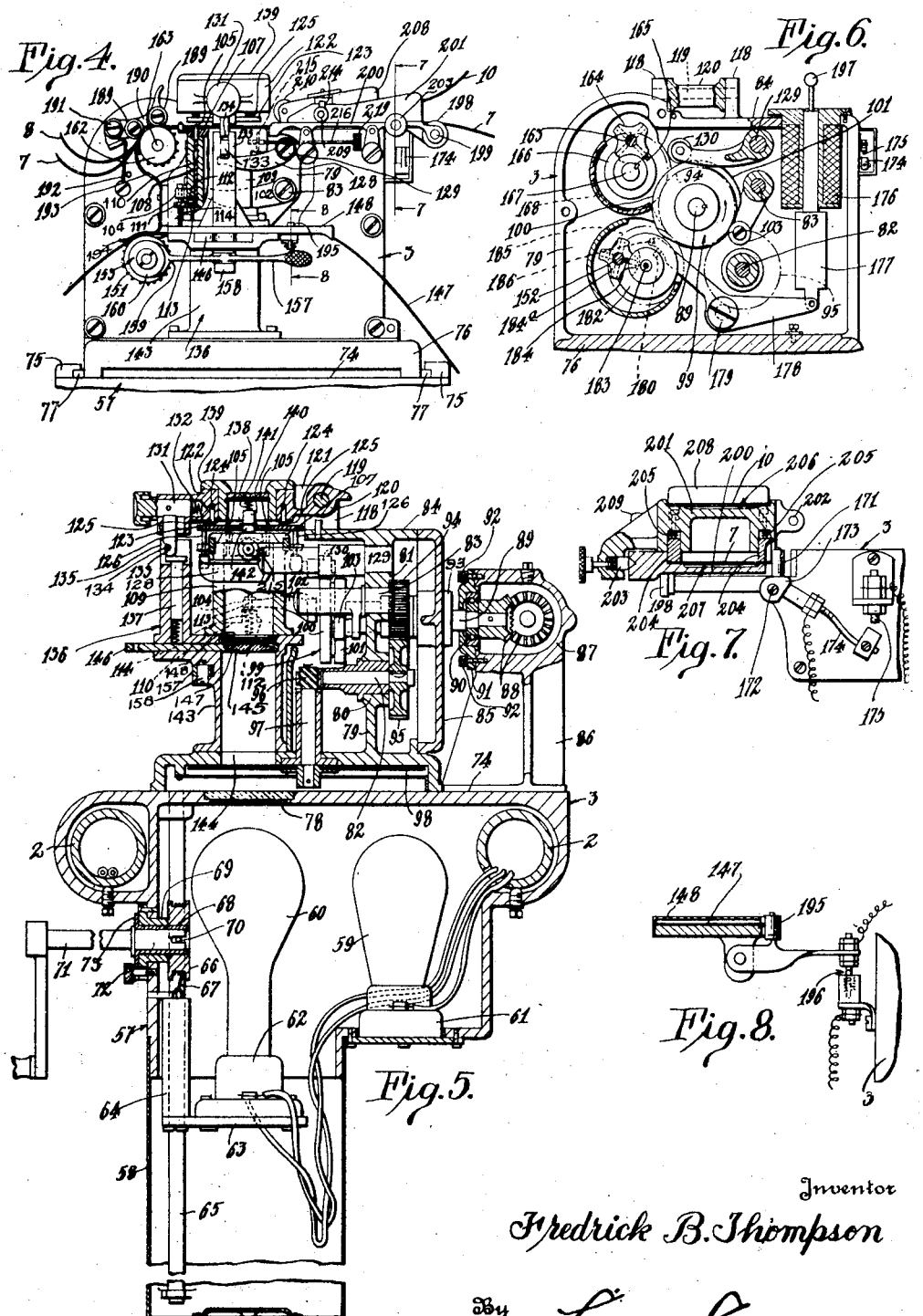

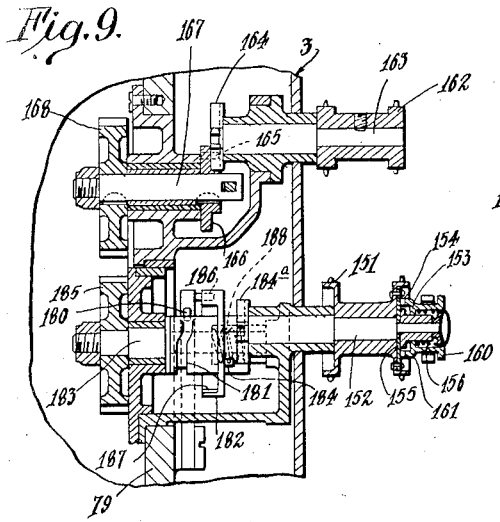
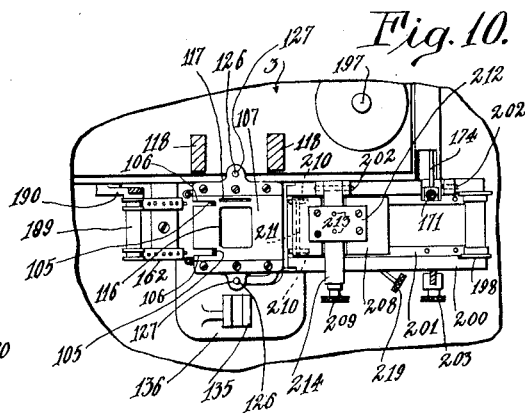
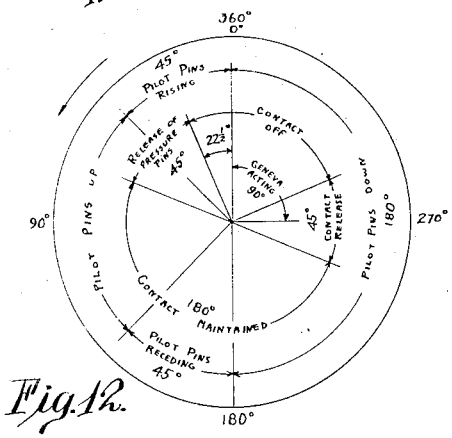
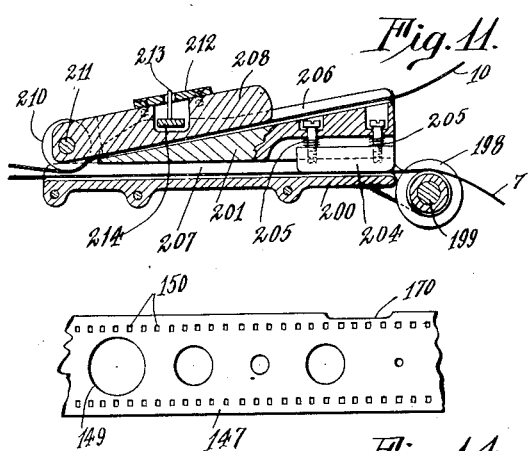
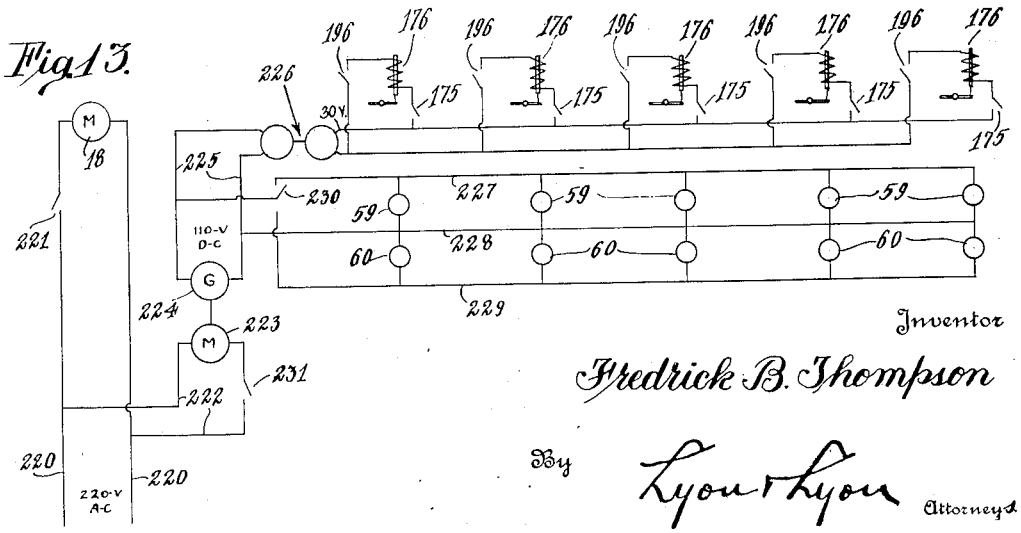

Patented July 7, 1931

1,813,000

UNITED STATES PATENT OFFICE

FREDRICK B. THOMPSON, OF HOLLYWOOD, CALIFORNIA, ASSIGNOR, BY MESNE ASSIGNMENTS, TO CINEMA PATENTS COMPANY, INC., OF NEW YORK, N. Y., A CORPORATION OF NEW YORK

PHOTOGRAPHIC FILM PRINTER

Application filed April 28, 1926. Serial No. 105,066.

This invention relates to photographic film printers and is more particularly directed to film printer units, which units are adapted to be connected together to form a gang or multiplicity of such units for the formation of a multiplicity of positive prints from a single negative and in which units means are provided for obtaining a uniform light intensity at the point of exposure in each of said units in accordance with the light intensity desired or required for the production of the positive from the negative in accordance with the scene passing through the said unit.

Film printer units, as heretofore designed and constructed, have been more or less unsatisfactory due to the inability to maintain definite light intensities through the changes of light intensity required by the different scenes of the photographic film. Also, these film printers have been slow in action and limited for the most part to the production of one positive from a negative during one run of the negative film.

This invention is particularly directed to an improvement of photographic film printer disclosed in my copending application, Serial No. 716,409, filed May 28, 1924, for Film printer. Like the film printer disclosed in my former application, the light intensity or change of light intensities for the different scenes is controlled by change of light admitting orifices to the point of exposure of the printing region of each unit. The change in orifice is accomplished by means of what I term a light strip which may be similar in every respect to a photographic film.

In order to provide for the control of the light intensity in accordance with the scenes being developed, there is formed in the light strip a plurality of recesses, calculated as to size, so as to admit the proper light intensity of the printing region at the time desired. The light strip is automatically actuated so that the orifice may be automatically changed as the negative film proceeds through the printing unit so that when a new scene enters the point of exposure in the said unit, the light intensity admitted to the said unit to develop such new scene will have been changed in accordance with that desired for the printing of that particular scene. This change of light strip is accomplished by automatic means which operates in conjunction with the travel of the negative film so that as the negative film proceeds into the unit, the movement of the negative film will actuate the automatic means to cause the light strip to be actuated to change the light orifice which is admitting the light to the point of exposure.

An object of this invention is to provide a film printer in which a light strip is employed having a plurality of light admitting orifices, which light strip is automatically actuated to position the orifice so as to admit the proper light intensity to the point of exposure in accordance with the scene desired printed.

Another object of this invention is to provide a film printer construction of unit design so that the film printer may be assembled in a gang for the continuous production of a plurality of positive prints from a single negative during a single run of the negative through the printing apparatus.

Another object of this invention is to provide means for intermittently contacting the negative film with the positive film at the point of exposure in the printed unit.

Another object of this invention is to provide a film printer unit in which means are provided for accurately centering the negative film with the sensitized film at the point of exposure.

Another object of this invention is to provide a photographic film printer in which means are provided for contacting the negative film with the sensitized film at their centers when or after the said films have been accurately centered at the point of exposure.

Another object of this invention is to provide a photographic film printer in which means are provided for centering a negative film in relation to a sensitized film prior to the contacting of the negative film with the sensitized film.

Another object of this invention is to provide a photographic film printer unit in which means are provided for disbursing the light admitted to the point of exposure of the said unit evenly throughout the said point of exposure so as to form a uniform positive print from the negative.

Another object of this invention is to provide a photographic film printer unit which is of comparatively inexpensive and simple construction and which units are interchangeable one for the other and which units are adapted to form positive films from negative films at a relatively high rate of speed and which units require a minimum of labor for their operation.

Other objects and advantages of this invention will be apparent from the following detailed description of a preferred embodiment thereof as illustrated in the accompanying drawings, in which drawings:

Figure 4 is an enlarged front elevation of one of the film printer units embodied in this invention.

Figure 5 is a fragmental side elevation of a film printer unit embodied in this invention, illustrating the same as mounted in position in the gang supporting frame and illustrating the light well construction embodied in this invention.

Figure 6 is a rear elevation of a film printer unit embodied in this invention illustrating the case removed to show the driving mechanism.

Figure 7 is a fragmental view taken substantially on the line 7—7 of Figure 4.

Figure 8 is a fragmental rear view illustrating the light strip control safety switch embodied in this invention and taken substantially on the line 8—8 of Figure 4.

Figure 9 is a fragmental side elevation of the Geneva guide mechanisms embodied in this invention.

Figure 10 is a fragmental top plan view of a film printer unit embodied in this invention, illustrating the same with the pressure gate removed to show the relative location of the centering means provided for centering the negative film with the sensitized film at the point of exposure.

Figure 11 is a sectional side elevation of pressure shoes embodied in this invention for imparting a tension to the negative film and sensitized film near the point of exposure.

Figure 12 is a timing diagram.

Figure 13 is a diagram of electrical connections.

Figure 14 is a fragmental plan view of a light strip embodied in this invention.

Figure 1:
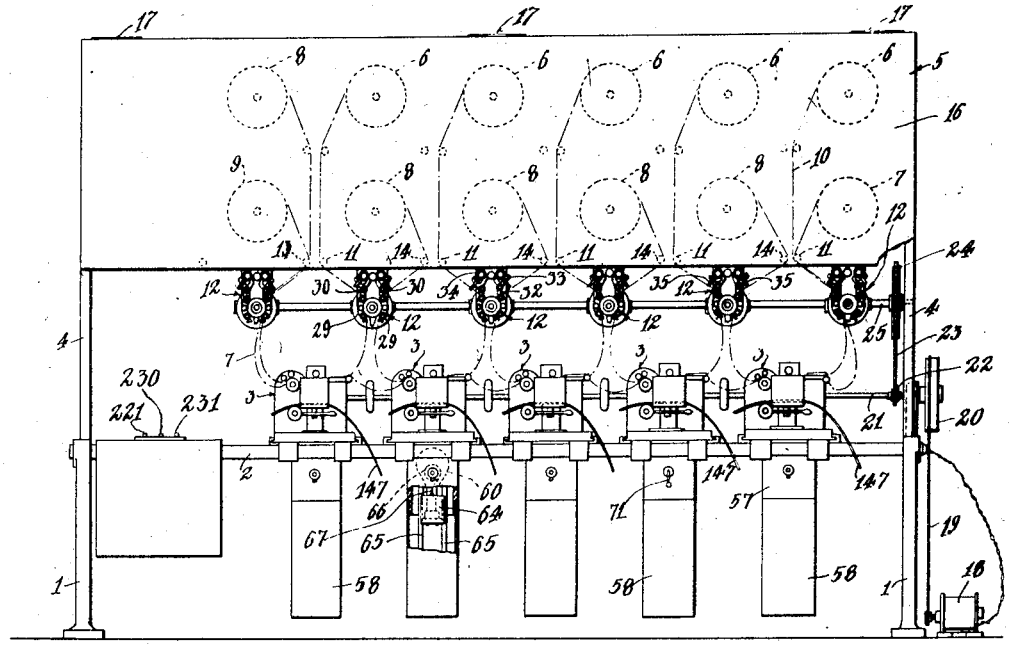
Figure 1 is a front elevaton of a gang of film printer units embodying this invention.
Figure 3:
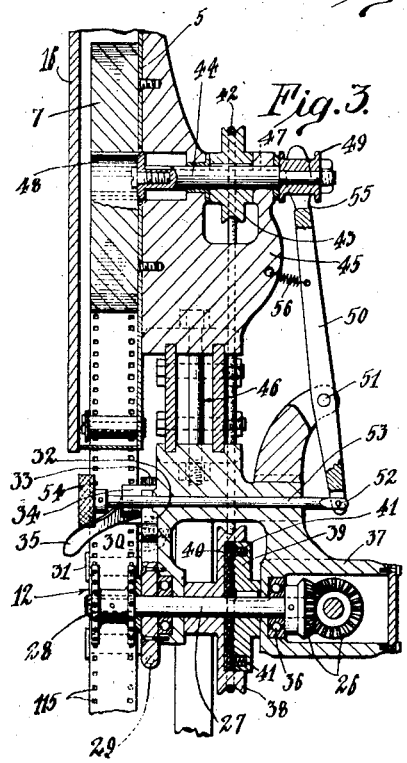
Figure 3 is a fragmental sectional end elevation illustrating the film carriage means provided and illustrating the driving mechanism as embodied in this invention for the said carriage.
Figure 2:
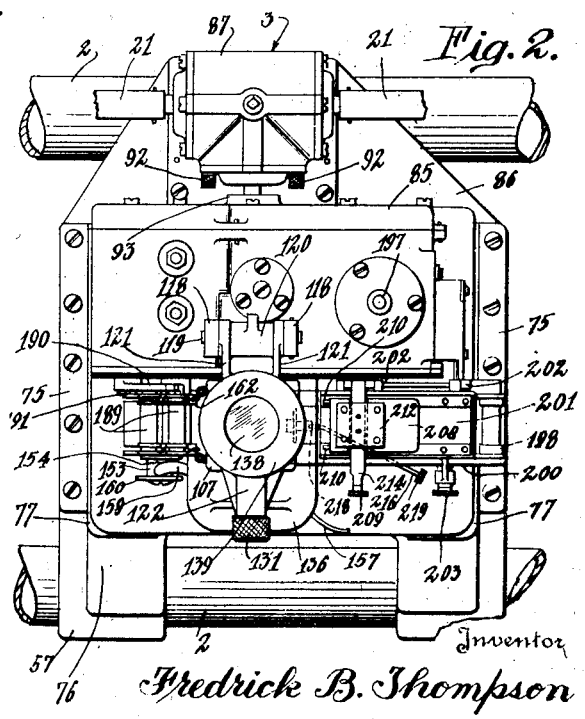
Figure 2 is a top plan view of the photographic film printing units embodied in this invention and illustrating the same as mounted in position in a fragment of the frame for supporting the gang of units.

In the preferred embodiment of this invention illustrated in the accompanying drawings, 1 illustrates spaced apart end frame members which are connected together by means of longitudinally extending tubular frame members 2 upon which tubular frame members 2 the film printer units 3 are supported in spaced relation. Vertically extending frame members 4 extend upward from the frame sections 1 and are secured to a box 5 in which reels 6, 7, 8 and 9 are mounted. The reel 6 is a sensitized film stock reel from which the sensitized film 10 is unreeled and trained over guide rollers 11 and through the film driving means 12 to the film printer units 3.

The reel 7 is the negative film stock reel which carries the negative film which is trained over the first guide rollers 11 and through the first driving means 12 and then in series through the separate film printing units 3 in substantially horizontal position to the last film driving means 12 guided over the end guide roller 13 and wound up upon the negative film stock reel 9.

The reels 8 are positive film takeup reels upon which the sensitized film, after being developed, is wound. The positive film, after leaving the film printer units 3, is trained through the respective drive means 12 and over guide rollers 14 which are mounted in the case 5. The case 5 may be of any desired or preferred construction and has a door 16 mounted on hinges 17 so as to permit the case 5 to be opened as a unit for the positioning of the respective reels in the training of the film printer unit or in the removing of the prints so that the same may be taken to the developing apparatus for developing. A motor 18 is provided for driving the printer units 3 and driving means 12 and for rotating the reels 7, 8 and 9. The motor 18 is connected by means of a belt 19 to a pulley 20, which pulley 20 is rigidly secured to a counter-shaft 21. On the counter-shaft 21 is secured a sprocket 22 which drives through the chain 23 a sprocket 24 which is secured to the driving means shaft 25. The driving ratio between the sprockets 22 and 24 is such that the shaft 22 is rotated eight times for each rotation of the shaft 25. The shaft 25 is connected through bevel gears 26 with the film drive sprocket shaft 27 upon which shaft 27 a film drive sprocket 28 is mounted. The film drive sprocket 28 drives the negative film and sensitized film from and to the film printer units 3.

Yieldable means are provided for maintaining the said films in driving engagement with the sprocket 28, which preferably comprises arcuate fingers 29 which are pivotally supported at pins 30 to permit the arcuate fingers to be rotated away from the sprockets 28 so as to permit the training of the films over the sprockets 28. The arcuate fingers 29 carry rollers 31 for engagement with the film so as to hold the film in engagement with the sprocket 28 without dragging on the said films. The arcuate fingers 29 are secured to links 32, which links 32 carry forks 33 which engage the cam rollers 34 so that by actuation of the cam rollers 34 by means of the actuating fingers 35, the arcuate fingers 29 may be rotated away from the film drive sprocket 28. Spring means (not shown) of any suitable or desirable construction may be employed for yieldably urging the arcuate fingers 29 toward the film drive sprockets 28. Bearings 36 are provided for the film drive sprocket shaft 27. The bearings 36 are supported in a casting 37, which casting 37 likewise provides a gear box for the bevel gears 26.

Means are provided for driving the take-up reels 8 so as to uniformly feed the sensitized film 10 over the drive sprocket 28, which means preferably comprise a pulley 38 which is journaled on the film drive sprocket 27 and is frictionally driven by means of a disc 39 which is keyed to the shaft 27 and carries a disc 40 which is yieldably urged into driving engagement with the pulley 38 by means of springs 41. A belt 42 is trained over the pulley 38 and over a pulley 43 which is mounted upon the stock reel shaft 44. The stock reel shaft 44 is journaled in a casting 45, which casting 45 is secured to the rear of the case 5, and which casting 45 supports the casting 37 by any suitable means such as illustrated at 46. The shaft 44 has an elongated keyway 47 formed therein and the pulley 43 carries a key which is slidable in the elongated keyway 47 so that the shaft 44 may be moved longitudinally relative to the pulley 43. The shaft 44 is secured at its forward end to a spool 48 upon which the roll of film is wound.

Means are provided for moving the spool 48 rearwardly upon the shaft 44 so as to strip the roll of film from the spool 48, which means preferably comprise a roller 49 journaled at the rear end of the shaft 44. An actuating link 50 is pivotally supported at a pin 51 and pivotally secured at its lower end by means of a pin 52 to an actuating rod 53 which extends through the casting 37 to the front of the apparatus and carries a knob 54 for actuating the same. The link 50 has a fork 55 at its upper end for engagement with the roller 49 so as to move the shaft 44 rearwardly so as to strip the spool 48 from the roll of film. A spring 56 is provided for holding the spool 48 in the advanced position.

Mounted on the tubular frame members 2 in spaced relation are castings 57, which castings 57 form the upper portion of the light well. Secured to the castings 57 are closure members 58 which close the lower end of the castings.

Mounted within the light wells provided by the castings 57 and closure members 58 are red lamps 59 and illuminating lamps 60. The lamps 59 are mounted in sockets 61, which sockets 61 are secured within the castings 57 in any suitable or desirable means. The illuminating lamp 60 is mounted in a socket 62 on a traveling block 63, which traveling block 63 is secured to a weight block 64, which weight block 64 is slidably mounted between rods 65 so as to permit vertical adjusting of the lamp 60. Means are provided for adjusting the position of the lamp 60 and for locking the lamp in the said adjusted position, which means preferably comprise a spool 66, upon which spool 66 a cable 67 is wound and which cable 67 is connected to the sliding sleeve 64. The spool 66 is secured to a hollow shaft 68 which extends through a bushing 69 which is passed through a bore formed in the casting 57. A pin 70 is passed through the bore of the hollow shaft 68 for engagement with the slotted end of the actuating crank 71, which may be removed from position after adjusting the position of the lamp 60. A lock-screw 72 is screw-threaded into the casting 57 in position to engage the outwardly turned flange 73 of the hollow shaft 68 so as to lock the lamp 60 in the adjusted position. The casting 57 provides a flat upper surface 74 with spaced apart slides 75, between which slides 75 the film printer units 3 are mounted so as to be removable. The base-plate 76 of the film printer units 3 having outwardly extending tongues 77 which are slidably engaged within the slot 75. A light bore 78 is formed through the upper flat portion of the casting 57. The film printer unit 3 in its sliding engagement between the guide 75 fits so closely as to provide a practically light proof engagement. The current leads to each of the lamps 59 and 60 are turned through the tubular frame members 2 and admitted into the castings 57 through bores formed in the tubular members 2 within the casting 57.

A ground glass plate is mounted in the bore 78 formed in the casting 57 so as to diffuse the light passing through the bore 78 from the lamp 60.

The base plate 76 is preferably formed as an integral part of a casting which has a vertically extending web 79 which has a pair of cored bosses 80 and 81 formed therein in which the shutter drive shaft 82 and the pilot pin rocker shaft 83 are journaled. The web 79 terminates in an upper transversely extending plate 84 which forms the rear portion of the enclosing case for the film printer unit 3. A gear case cover 85 is provided which is secured to the upwardly turned rib of the base plate 76 and to the transversely extending plate 84 at the upper end. A standard 86 is secured to the upper surface 74 of the casting 57 and provides a bearing support for the counter-shaft 21 and an enclosing case 87 for the beveled gears 88, which beveled gears 88 form a driving connection between the counter-shaft 21 and the drive-shaft 89 for the printer unit 3. The shaft 89 is journaled in bearings 90 mounted in a closure plate 91 for the case 87. The closure plate 91 is removably secured to the case 87 by means of cap screws 92 so as to permit the withdrawal of the shaft 89 and its beveled gear 88 from the case 87 when it is desired to remove the film printer unit 3 from the assembly.

The construction of each of the film printer units 3 is entirely the same so that it is deemed necessary only to describe one of such film printer units 3, any one of which film printer units 3 may be connected in gang relation as illustrated in Figure 1.

The drive-shaft 89 extends through a boss 93 which supports a bearing for the shaft 89 and is provided within the case with a gear 94 which meshes with a gear 95 which is keyed to the shutter drive shaft 82. A spiral gear drive 96 connects the drive-shaft 82 with the shutter-shaft 97, upon which shutter-shaft 97 a rotary shutter 98 is mounted. The rotary shutter 98 may be of any desired or preferred construction as is well understood in the art. The rotary shutter 98 is revolved to intermittently arrest the flow of light from the lamp 60 to the point of exposure of the film printer unit 3 and is so timed that the light from the lamp 60 is admitted to the point of exposure only after the negative and sensitized films have been properly centered and contacted as will hereinafter be described.

The shaft 89 extends through the web 79 and is provided at its inner end with a double faced cam 99, which double faced cam 99 provides a pair of cam faces 100 and 101. The pilot pin rocker shaft 83 has a rocker arm 102 formed integral therewith which carries a cam roller 103 which rides upon the cam surface 101. A pilot pin hold-down arm 104 is formed at the inner end of the pilot pin rocker shaft for holding the pilot pins 105 down. The pilot pins 105 extend through recesses 106 formed in the contact plate 107. The pilot pins 105 extend through bores 108 formed in the light directing sleeve 109. The pilot pins 105 are formed as an extension of the plate 110 which has a right angled extension 111 which extends through a slot 112 formed in the sleeve 109. The extension 111 is engaged by a pin 113 adjustably secured at the end of the pilot pin hold-down arm 104 so as to permit adjustment of the hold down position of the pilot pins 105 relative to the surface of the contact plate 107. A compression spring 114 is provided which yieldably urges the pilot pins 105 upward through the slots 106 and above the surface of the contact plate 107 so that the ends of the pilot pins 105 will pass into the side perforations 115 which are formed in the sides of the negative and sensitized films so as to center the said films over the aperture 116 formed in the contact plate 107. The aperture 116 formed in the contact plate 107 is of the same transverse area as a single frame of the negative film. An exposure slot 117 is formed in the contact plate 107 so as to form an exposure line on the edge of the film outside of the perforations 115 so as to direct the operator of the projecting machine in which the film is to be projected in positioning the film in the said projecting machine.

Formed on the transversely extending plate 84 are a pair of upwardly extending lugs 118, in which lugs 118 a pin 119 is secured and on which pin 119 a sleeve 120 is journaled and which sleeve 120 has a pair of extensions 121 formed integral therewith, which extensions 121 are likewise secured integral with the pressure gate 122. The pressure gate 122 carries an upper contact plate 123.

Secured to the upper contact plate 123 are upwardly extending pins 124, which pins 124 extend into bores formed in the pressure gate 122 and are yieldably urged downwardly by means of compression springs 125 which are mounted upon the said pins 124 between the lower surface of the pressure gate 122 and the surface of the upper pressure plate 123 so as to yieldably urge the pressure plate 123 toward the contact plate 107 for contacting the positive film with the negative film at the point of exposure of the films in the printer unit 3 after the said films have been centered by the pilot pins 105 as heretofore described.

In order to hold the upper pressure plate 123 from the contacting position, pins 126 are provided in position to engage the undersurface of the said plate 123. The pins 126 are guided in bores 127 formed in ears which extend outwardly from the contact plate 107. The pins 126 are engaged at their lower end by the ends of a forked actuating arm 128, which forked actuating arm 128 is secured to or formed integral with a rocker shaft 129, which rocker shaft 129 is journaled in a bore formed in the web 79 and has formed integral therewith an arm which carries a cam engaging roller 130 which rides upon the cam surface 100 of the double faced cam 99. The pins 126, it will be seen, are thereby positively driven upward so as to move the upper pressure plate 123 from the contacting position and are yieldably urged downward by means of the compression springs 125, which compression springs 125 likewise urge the upper pressure plate 123 into position to contact the negative film with the sensitized film on the contact plate 107.

The pressure plate 122 is provided with a latch at its forward end for securing the gate 122 in the operating position. The latch comprises a plunger 131 which is mounted in a bore formed in the upward extension of the gate 122 and is yieldably urged outward by means of a compression spring 132. The plunger 131 carries a latch lever 133 which is adapted to engage a pin 134 mounted in the standard 135 which is formed integral with the casting 136. A second spring pressed plunger 137 is provided for yieldably maintaining the latch in the closed position.

The pressure gate 122 is provided with an observing glass 138 which observing glass is of ruby construction and is carried in a sleeve 139 which is positioned centrally in the gate 122.

Means are provided for contacting the sensitized film with the negative film at the center of the respective frames which are positioned and centered over the aperture 116 formed in the contact plate 107 so that the films will be first contacted at the center thereof and then contacted by means of the upper pressure plate 123 at their edges. This means preferably comprises a small plunger 140 which is slidably mounted in a bore formed centrally of the upper pressure plate 123 and which is yieldably urged downwardly by means of a compression spring 141 which is interposed between the upper end of the said plunger and the ruby glass 138.

The upward or engaging end 142 of this plunger 140 extends slightly in advance of the contacting surface of the upper pressure plate 123 so that the sensitized film will be first contacted with the negative film at the point of exposure prior to the contacting of the said films by the pressure plate 123. The provision of the plunger 140 is an important feature of my invention as it enables me to obtain a perfect contact between the negative and positive films which in existing printers is often not the case, due to the warping of the frames of the film at the center thereof during the contacting of the films and this provision of means for first contacting the films at the center enables me to form a more perfect print from the negative film which is uniform throughout the frames of the film. Other similar means might be provided for contacting the said films at their centers.

The upper pressure plate 123 is provided with a plurality of perforations or slots so as to permit the sensitized film to be contacted with the negative film between the contacting print 123 and the sensitized print.

The casting 136 forms a light directing tube 143 which is aligned with the bore 144 formed in the base plate 76 immediately over the ground glass which is mounted in the bore 78 formed in the casting 57.

Means are provided for focusing the light admitted through the light tube 143 at the point of exposure in the film printer unit 3, which means preferably comprise a lens 145 which is mounted in a slide 146 so that the same may be positioned centrally of the light tube 143 and so that the lens 145 may be removed from position for cleaning or changing as the particular conditions of operation may require. The light tube 143 communicates directly with the sleeve 109, which sleeve 109 has a central bore formed therethrough for the purpose of directing the light to the point of exposure.

Means are provided for automatically regulating the light intensity which is permitted to flow from the lens 145 to the point of exposure, which means preferably comprise what I term a light strip 147. The light strip 147 is automatically actuated in a manner that will hereinafter be specifically described and passes through a frame 148 which is mounted at the upper end of the light directing tube 143 and immediately above the lens 145. The light strip 147 has a plurality of orifices 149 formed therein, which orifices are of different diameter calculated so as to admit the exact light intensity required or desired to the point of exposure from the lamp 60. The light strip 147 is formed before the printing operation is started and is formed from the known light intensity which is desired at the point of exposure for printing the respective scenes of the photographic film. This light strip therefore provides a means of indefinite light intensity changes as the same may be of indefinite length and provided with an indefinite number of light admitting orifices 149 and has been demonstrated to be an extremely efficient means for controlling the light changes desired at the point of exposure.

Means are provided for automatically actuating the light strip 147, which means are preferably of the following construction:

The light strip 147 is formed similar to a photographic film in that it has perforations 150 formed in its edges so that the same may be carried by a sprocket 151, which sprocket 151 is automatically actuated to move the light strip 147 to change the orifice 149 which is admitting light to the point of exposure. The sprocket 151 is journaled on a shaft 152 and is engaged by means of a clutch sleeve 153 which is slidably mounted on the outer end of the shaft 152. The clutch sleeve 153 has a tooth engaging edge surface 154 which engages a light toothed surface formed on the side of the plate 155 which is secured to the sprocket 151. A compression spring 156 is mounted on the shaft 152 so as to yieldably urge the clutch sleeve 153 into the engaging position. Means are provided for disengaging the clutch sleeve 153 so as to permit the threading of the light strip 147 which means preferably comprise a clutch operating lever 157 which is pivotally supported at a pin 158 and is provided at its end with a fork 159 which is journaled on the clutch sleeve 153 intermediate the flanges 160 and 161.

Means are provided for actuating the shaft 152, which means are controlled by the driving of the negative film through the printer unit 3. The negative and positive films, after passing through the point of exposure of the printer unit 3 are trained over a drive sprocket 162, which drive sprocket 162 is rigidly secured to the sprocket shaft 163, which sprocket shaft 163 has secured to its inner end a Geneva star wheel 164. The Geneva star wheel 164 is actuated by means of a pin 165 which is carried by a disc 166 which is rigidly secured to the Geneva drive shaft 167.

The Geneva drive shaft has at its opposite end a gear 168 which meshes with the gear 94 which is secured to the drive shaft 89 so that the star wheel 164 is intermittently actuated to intermittently rotate the sprocket 162 to intermittently move the negative and positive films through the printer units 3.

The negative film has formed in its edge a notch similar to the notch 170 illustrated in the light strip 147. A roller 171 is pivotally supported at a pin 172 on the support 173 so as to permit the roller 171 to move into the notch formed at the edge of the negative film. A contact arm 174 is secured to the support 173 and is adapted to engage a stationary contact 175 supported by the frame of the film printer unit so as to complete an electrical circuit to a solenoid 176 to energize the solenoid so as to operate a second Geneva mechanism which is operatively connected with the sprocket 151 to move the light strip 147 to change the orifice 149 which is admitting light to the point of exposure of the film printer unit 3. The contact arm is yieldably urged toward the edge of the negative film and toward the position to contact the contact 175 by any suitable means such, for example, as a light spring (not shown). The Geneva mechanism for actuating the sprocket 151 is preferably of the following construction:

The core 177 of the solenoid 176 is pivotally secured to a link 178, which link 178 is pivotally supported intermediate its ends at a pin 179 and carries at its opposite end a pin 180 which is adapted to be engaged in a cam track 181 to move the disc 182 transversely along the shaft 183. The disc 182 carries a Geneva pin 184 which is adapted to engage the Geneva star wheel 184ª so as to rotate the Geneva star wheel. The Geneva star wheel 184ª is rigidly secured to the inner end of the shaft 152, which carries the sprocket 151. The shaft 183 is provided at its inner end with a gear 185 which is adapted to mesh with the gear 94 mounted on the drive shaft 89 so that the shaft 183 is at all times rotated.

Means are provided for maintaining the pin 180 in engagement with the cam track 181 until the disc 182 has caused the star wheel 184 to rotate through 180°. This means preferably comprises a pin 186 which is secured to the edge surface of the link 178 and is adapted to engage under the flange 187 of the disc 182, which flange is formed like a cam surface of varying thickness so as to liberate the pin 186 after 180° rotation of the shaft 183. In order to move the Geneva pin 184ª from the position to engage the star wheel 184, a compression spring 188 is provided.

In order to maintain the negative and positive prints in contact with the sprocket 162, rollers 189 are provided which rollers 189 are mounted on pins carried in an arcuate finger 190 which is pivotally supported at a pin 191 on the frame. A flat steel spring 192 is provided for holding the roller 189 against the sprocket 162.

A stripper bar 193, formed of a flat piece of spring steel or the like, is secured to the frame in position to strip the negative and positive film from the sprocket 162 so as to permit the negative film to be carried to the next printer unit 3 and the positive print to be driven by the driving means 12 to the takeup reel 8 and so that the films will not be carried around the sprocket wheel 162. The stripper bar 193 also provides means at its opposite end 194 for maintaining the light strip 147 in engagement with the sprocket 151.

A roller 195 is provided for use in connection with the light strip 147 for actuating a contact switch 196 to break the circuit to the solenoid 176 when the negative film has run through the printer unit so as to prevent burning out of the coil of the solenoid 176 due to continuous changing thereof.

Means are provided for changing the light orifice which admits the light to the point of exposure of the film printer units 3 for each frame of the negative film that is to be printed so as to produce what is known in the art as fade in and fade out as the case may be, which means comprise a knob 197 which is secured by means of a rod to the core 177 of the solenoid 176 so as to permit the operator to manually maintain the Geneva mechanism for rotating the sprocket 151 in position to operate continuously so that the orifice will be changed during the movement of the negative film for each plate of each frame of the negative film.

Means are provided for imparting a drag or tension to the negative and positive film and for maintaining the negative and positive film separate until the same are substantially at the point of exposure so as to prevent negative slippage between the surfaces of the negative and sensitized films so as to prevent scratching of the sensitized film by the positive film, which means are preferably of the following construction:

The negative film is first trained over an idle roller 198 which is thrown on a pin 199. The negative film, leaving the idle roller 198, travels along the surface of a shoe 200 which is secured to the frame of the machine. A casting 201 is pivotally supported at pins 202 and is provided with a spring latch 203 for securing the same in position. A pair of pressure feet 204 are provided which are yieldably urged downward by means of springs 205 against the edge of the negative film so as to impart a tension to the negative film as the same is drawn to the point of exposure by the sprocket 162.

The upper portion of the casting 201 provides a runway for the sensitized film 10 and is recessed as illustrated at 206 to fit the film. The surface of the shoe 200 is also recessed as illustrated at 207. A weighted member 208 is mounted on the casting 201 and is latched in position by means of a second spring latch 209 which secures the weighted member 208 to the casting 201. Roller 210 is mounted on a pin 211 at the delivery end of the weighted member 208. The roller 210 is so mounted as to put a slight kink in the sensitized film 10 so as to impart a tension to the sensitized film so as to prevent the same from being drawn freely into the printing unit 3 by the sprocket 162 but is so located as not to contact the sensitized film with the negative film. A plate 212 is secured to the upper surface of the weighted member 208 and provides a guide for the pins 213 which are secured to the transverse member 214 of the spring latch 209. The negative film and the sensitized film, it will be observed, are maintained separate with separately imparted tensions so as to hold two films apart until the same are centered at the point of exposure of the printing unit 3 so as to prevent one film from rubbing against the other which results in a tendency to scratch the sensitized film.

Means are provided for accurately centering the contact plate 107 so as to accurately position the aperture 116 thereof, which means comprise a disc 215 which is secured to an operating shaft 216 and fits within a groove (not shown) formed in the under edge of the contact plate 107. The shaft 216 is screw-threaded into the sleeve 109 and is provided with a universal joint of any suitable construction and diametrically illustrated at 218 so as to permit the end thereof to extend outward to a point of access. The end of the shaft 216 is provided with a hand-knob 219 to permit easy rotation of the same so as to turn the shaft 216 to move the disc 215 so as to slide the contact plate 107 to the desired position.

Referring now to the diagram of electrical constructions, 220 illutrates power leads which may lead from any suitable source of electrical energy. The motor 18, which drives the film printer units and assembly, is connected across the leads 220 and a switch 221 is mounted on one of the leads 220 so as to control the operation of the motor 18. The leads 220 are connected by wires 222 to a second motor 223 which operates a generator 224 for the generation of direct current, which direct current generator 224 supplies a direct current to the leads 225 which are connected through a motor-generator set 226 to reduce the current to substantially thirty volts with the solenoids 176. The solenoids 176 are connected in parallel in the leads 225. The contact switch 196 is mounted in one of the leads to the solenoids 176 and the contact switch 175 is mounted in the opposite lead of the conduit connecting the solenoids 176. Direct current is also supplied for the red and white lamps 59 and 60 which are connected in parallel across leads 227 and 228 and leads 228 and 229, respectively. A switch 230 is mounted in one of the leads, say lead 227, for controlling the supply of current to the red and white lamps 59 and 50. A switch 231 is provided in the leads 222 for controlling the admission of current to the motor 223 which operates the generator 224. To operate the printer units, it is therefore necessary to close each of the switches 221, 230 and 231.

The timing of the plates of operation of the different parts of each film printer unit 3 will be easily understood from the timing diagram as shown in Figure 12, the operation being timed so that the pilot pins are first raised through a rotation of 45° of the double faced cam 99. The pilot pins remain in the raised position for centering the negative film with the sensitized film during 90° further revolutions of the said cams. During the next 45° of rotation of the cams, the pilot pins are withdrawn and remain down during the next 180°. The double faced cam 99 first permits the upper pressure plate 123 to contact the sensitized film with the negative film on the contact plate 107 after the pilot pins have been raised and have been held in the raised position for substantially 22½° further rotation of the double faced cam 99. The contact is then maintained for substantially 180°, at which time the cam surface 100 operates to actuate the pins 126 to raise the upper pressure plate 123 to release the contact. The contact release requires substantially 45° of revolution, after which the contacts remain off for 90°, after which the hold-down pressure upon the pressure pin 126 is released, which release comprises about 45°, during which time, the contact of the upper plate 123 of the sensitized film with the negative film on the contact plate 107 is again obtained.

In order to obtain a mechanical balance of operation of the respective units 3 and so as to require a minimum of power from the motor 18, the respective units are set to operate at different intervals of time. The operation of the units 3 being timed when five such units are employed as illustrated in Figure 1 of the drawings so as to come into operation at approximately 72° intervals of rotation of the counter shaft 21.

The moving of the negative film and the sensitized film to the point of exposure or over the aperture 116 of the contact plate 107 is effected through 90° of the cycle of operation and after the contact between the contact plate 123 against the sensitized film, to contact the same with the contact plate 107, has been subsantially released and the movement of the films to position a new frame over the aperture 116 requires approximately 90° of the cycle of operation, after which the pilot pins are raised to center the films over the aperture as heretofore described.

The operation of the gang of printer units 3 is substantially as follows:

The reels of film are first mounted in the case 5 and are threaded over the respective guide rollers and through the driving means 12 so that loops are provided between the drive means 12 and the respective pressure shoes which impart tension to the film. The film is then fed through the tension imparting members 205 and 208 and against the aperture 116 and over the drive sprocket 162 and the sensitized film is then threaded through the opposite side of the second drive means 12 and upon the takeup roll of the reel 8. The negative film is permitted to have a loop intermediate the units 3 and is then threaded through the second unit 3 as heretofore described. The position of the lamp 60 is then carefully adjusted by means of the crank 71 employing a photometer as required to provide the exact light intensity desired at the point of exposure. The light strip 147 is then threaded through the guide 148 and over the light strip sprocket 151 so as to position the desired orifice 149. Separate light strips are preferably employed for each of the film printer units 3 and may be of exactly the same formation as to the orifices so as to form identical prints from the same positive. The motor is then set in operation by closing the switch 221 and the switches 230 and 231 are then closed so as to supply the current to the lamps 59 and 60 as required. The printers then operate automatically to print the entire roll of reel of film from the negative and in the set up of printer units, illustrated in Figure 1, five of such prints would be formed from a single run of negative film.

Having fully described a preferred embodiment of my invention, it is to be understood that I do not wish to be limited to the exact details herein set forth, which may obviously be varied without departing from the spirit of my invention as set forth in the appended claims.

I claim:

1. In a film printer unit, the combination of a contact plate, means for drawing a negative film and sensitized film over the contact plate, a pressure plate supported in position above the contact plate means carried by the pressure plate for first contacting the said films at their centers, and yieldably urged toward the contact plate, means for holding the pressure plate away from the contact plate, and means for intermittently releasing the said holding means so as to permit the pressure plate to move toward the contact plate to contact the negative film and the sensitized film at the point of exposure of the said unit.

2. In a film printer unit, the combination of a contact plate provided with an exposure aperture mounted on the said frame, a gate pivotally secured to the said frame, a ruby observing glass mounted in the said frame in position over the exposure aperture, means for latching the pressure gate in the closed position, and a yieldable pressure plate carried by the said gate and provided with spring means for yieldably urging the pressure plate toward the contact plate to engage a sensitized film to contact the same with a negative over the said exposure aperture.

3. In a film printer unit, the combination of means for imparting a drag to a sensitized film, means for imparting a drag to a negative film, a sprocket over which the negative film and positive film are trained and by which the negative film and sensitized film are driven, a point of exposure between the said sprocket and said drag, mean for centering the said films, means for contacting the center of the sensitized film with the center of the negative film after the same have been centered at the point of exposure, means for contacting the remaining portion of a frame of the films at the point of exposure after the centers thereof have been contacted, and means for intermittently actuating the said sprocket to intermittently move the films over the point of exposure.

4. In a film printer unit, the combination of a frame, a sleeve supported in the frame, a contact plate mounted at the upper end of the sleeve in substantially horizontal position and provided with an exposure aperture, a pressure plate mounted in position above the contact plate, means for yieldably urging the pressure plate toward the contact plate, pins slidably supported by the said sleeve in position to engage the under edge of the said pressure plate, and driven means for engaging the said pins with the pressure plate to hold the said pressure plate away from the contact plate and releasable to permit the said pressure plate to yieldably contact a sensitized film with a negative film over the exposure aperture.

5. In a photographic film printer unit, the combination of means for intermittently contacting a negative film with a sensitized film at a point of exposure, said means comprising a sleeve, a contact plate secured to the sleeve and having an exposure aperture, a pressure gate, a pressure plate mounted in the pressure gate, and means for causing an intermittent vertical movement of the pressure plate and means for intermittently admitting light to the point of exposure.

6. In a photographic film printer, the combination of a frame, a plurality of film printer units removably mounted on the frame, a reel box supported by the frame and adapted to contain a negative stock reel, a plurality of sensitized film stock reels, a plurality of positive print take-up reels and a negative take-up reel, a counter-shaft connected in driving relation with each of the film printer units, means for driving the counter-shaft, drive means interposed between the reel box and each of the film printer units for driving the positive print from one of said units while driving a sensitized film to the next succeedng unit, and means for driving the said driving means.

7. In a photographic film printer, the combination of a frame, a plurality of printer units removably mounted on the frame, means for causing an intermittent travel of a negative film through the said units, means for causing an intermittent travel of a sensitized film through each unit, means for contacting the sensitized film with the negative film at the point of exposure of the respective units, a drive shaft, means for operatively connecting each unit in driving relation to the drive shaft, and means for disconnecting any one of the drive connections from said shaft to the units.

8. In a photographic film printer, the combination of a frame, a reel box supported by the frame, a negative stock reel mounted in the said box, a plurality of sensitized film stock reels mounted in the said box, a plurality of positive print takeup reels mounted in the said box, a negative takeup reel mounted in the said box, drive means for each of said films, a drive means shaft operative to drive the said drive means, means for driving the said drive means shaft, a plurality of printer units mounted in the said frame, means for causing an intermittent travel of one of the sensitized films through each unit, means for causing an intermittent travel of negative film through all of the said units, and means for contacting each sensitized film with the negative film at the point of exposure.

9. In a photographic film printer unit, the combination of a contact plate having an exposure aperture therein, a pressure plate yieldably supported in position above the said contact plate, a light well, means for directing light from the light well to the exposure aperture, means interposed in the light directing means and automatically actuated by the travel of the films over the contact plate for regulating the light intensity admitted to the point of exposure, means for intermittently actuating the pressure plate to first contact the center of the films and subsequently the remainder of the said films on the contact plate over the point of exposure, and shutter means interposed in the said light directing means for stopping the light when the said pressure plate is in the non-contacting position.

10. In a battery of photographic film printer units, the combination of means for intermittently driving a negative film through all of said units, means for driving a sensitized film through each unit, and means for driving said printer units, said latter means including a shaft, means for driving the shaft, a plurality of spaced pinions mounted on the shaft, a drive pinion for each unit connected with one of said spaced pinions, the driving pinions of the printer units being secured to the drive shafts thereof, a housing for each pair of pinions, a cover for said housing, a bearing mounted in said cover and in which bearing the printer drive shaft is journaled, and means for removably securing the cover to the housing.

11. In a photographic film printer, the combination of means for feeding a negative film and a sensitized film to a point of exposure, means for varying the light intensity admitted to the point of exposure, means for imparting a drag to the negative film as the same is fed to the point of exposure, said means including a yieldably urged foot adapted to engage the side of the negative film, and means for automatically actuating said light intensity change means including an actuating roller adapted to engage the edge of the negative film, said actuating roller being mounted adjacent said yieldable foot.

Signed at Los Angeles, California, this 22nd day of April, 1926.

FREDRICK B. THOMPSON.